(12) United States Patent
Lee

(10) Patent No.: US 10,255,149 B2
(45) Date of Patent: Apr. 9, 2019

(54) REDUNDANT STORAGE DEVICE, SERVER SYSTEM HAVING THE SAME, AND OPERATION METHOD THEREOF

(71) Applicant: SAMSUNG ELECTRONICS CO., LTD., Suwon-si, Gyeonggi-Do (KR)

(72) Inventor: Sang-Geol Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 176 days.

(21) Appl. No.: 15/364,734

(22) Filed: Nov. 30, 2016

(65) Prior Publication Data

US 2017/0153955 A1 Jun. 1, 2017

(30) Foreign Application Priority Data

Dec. 1, 2015 (KR) .................. 10-2015-0170113

(51) Int. Cl.
*G06F 11/20* (2006.01)
*G06F 3/06* (2006.01)

(52) U.S. Cl.
CPC ........ *G06F 11/2069* (2013.01); *G06F 3/0605* (2013.01); *G06F 3/065* (2013.01); *G06F 3/0614* (2013.01); *G06F 3/0688* (2013.01)

(58) Field of Classification Search
CPC ................................................. G06F 11/2069
USPC .................................................... 714/30, 31
See application file for complete search history.

(56) References Cited

U.S. PATENT DOCUMENTS

| | | | |
|---|---|---|---|
| 5,928,367 A * | 7/1999 | Nelson | G06F 11/1666 714/6.3 |
| 7,146,448 B2 * | 12/2006 | Davies | G06F 11/2005 710/302 |
| 7,627,780 B2 * | 12/2009 | Davies | G06F 11/2028 714/10 |
| 7,679,133 B2 | 3/2010 | Son et al. | |
| 8,553,466 B2 | 10/2013 | Han et al. | |
| 8,559,235 B2 | 10/2013 | Yoon et al. | |
| 8,589,626 B2 | 11/2013 | Cho | |
| 8,654,587 B2 | 2/2014 | Yoon et al. | |
| 8,711,681 B2 * | 4/2014 | Hu | H04L 41/0668 370/219 |
| 8,762,774 B2 * | 6/2014 | Wu | G06F 11/2025 714/11 |
| 8,908,378 B2 | 12/2014 | Kim | |
| 9,606,915 B2 * | 3/2017 | Horspool | G06F 12/0253 |
| 2011/0233648 A1 | 9/2011 | Seol et al. | |
| 2014/0082276 A1 | 3/2014 | Suzuki et al. | |
| 2014/0149666 A1 * | 5/2014 | Nakagawa | G06F 3/0605 711/114 |

(Continued)

FOREIGN PATENT DOCUMENTS

| | | |
|---|---|---|
| JP | 2014-041524 | 3/2014 |
| JP | 2015-135586 | 7/2015 |

(Continued)

*Primary Examiner* — Joseph R Kudirka
(74) *Attorney, Agent, or Firm* — F. Chau & Associates, LLC

(57) ABSTRACT

A redundant storage device includes a first port, a second port different from the first port, a first storage device connected to the first port, and a second storage device connected to the second port. The first storage device changes an operation mode of the second storage device from a standby mode to an active mode using an internal communication.

18 Claims, 13 Drawing Sheets

(56) References Cited

U.S. PATENT DOCUMENTS

2015/0134880 A1* 5/2015 Danilak .............. G06F 12/0246
711/103
2015/0242128 A1 8/2015 Margalit et al.
2017/0083417 A1* 3/2017 Kawaguchi ........... G06F 3/0619

FOREIGN PATENT DOCUMENTS

KR 1020110053304 5/2011
KR 1020150078016 7/2015
WO WO-2016013116 A1 * 1/2016 ........... G06F 3/0619

* cited by examiner

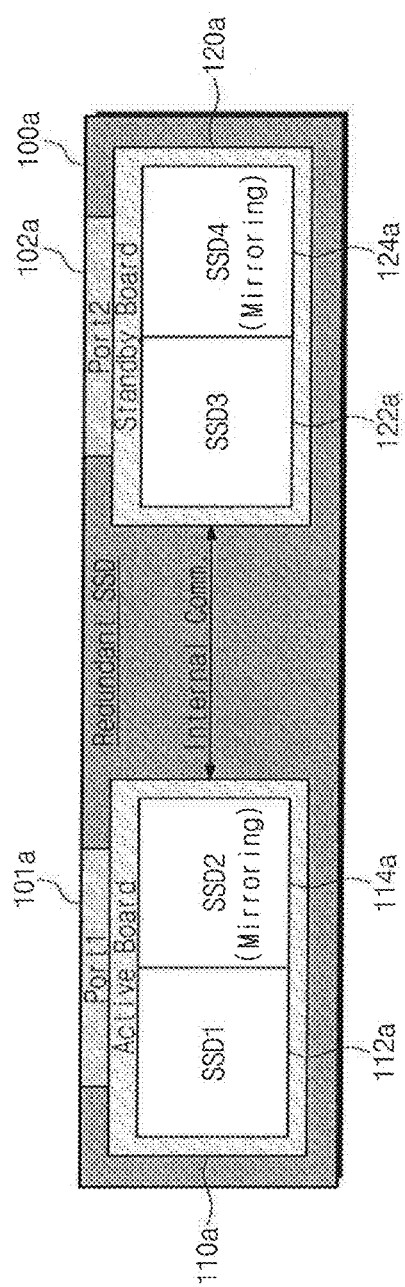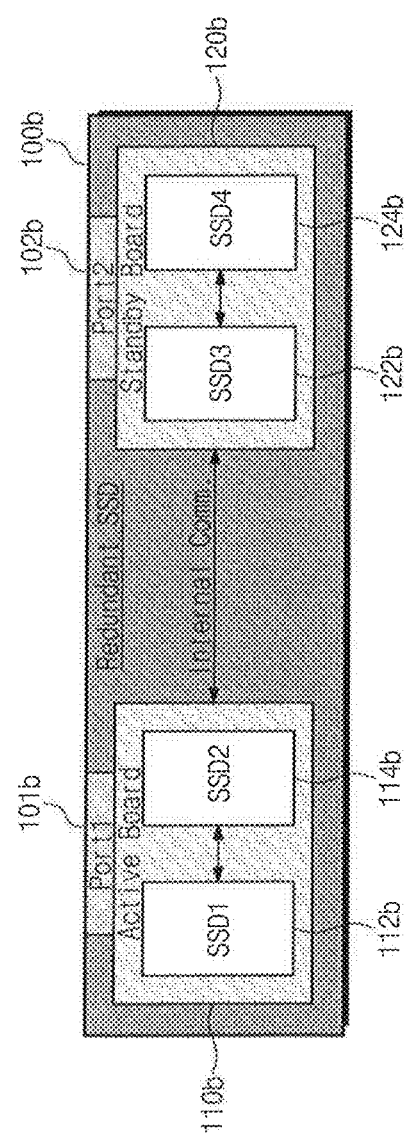

REDUNDANT STORAGE DEVICE, SERVER SYSTEM HAVING THE SAME, AND OPERATION METHOD THEREOF

CROSS-REFERENCE TO RELATED APPLICATION

This U.S. non-provisional patent application claims priority under 35 U.S.C. § 119 to Korean Patent Application No. 10-2015-0170113 filed Dec. 1, 2015, the disclosure of which is incorporated by reference in its entirety herein.

BACKGROUND

1. Technical Field

The inventive concept described herein relates to a redundant storage device, a server system having the same, and an operation method thereof.

2. Discussion of Related Art

A micro server is a server class computer based on a system on chip (SoC). A micro server includes a processor module, which is inserted in the body of a micro server system. Typically, the processor module is not vertically stacked along with other processor modules in a rack server such as a rack mount server. The processor module is referred to as "high-density server" in the sense that a lot of servers are inserted and installed in a narrow space. The processor module includes one or more central processing units (CPUs), a memory device, and an operating system. The processor module receives a power supply and inputs, provides outputs, and performs the function of a server. However, if a micro server malfunctions, the data it stores may be lost.

SUMMARY

According to an embodiment of the inventive concept, a redundant storage device includes a first port, a second port different from the first port, a first storage device connected to the first port, and a second storage device connected to the second port. The first storage device changes an operation mode of the second storage device from a standby mode to an active mode using an internal communication.

According to an exemplary embodiment of the inventive concept, a redundant storage device includes a first adapter, a second adapter different from the first adapter, a first storage device connected to the first adapter and operating in an active mode, a second storage device connected to the first adapter and configured to mirror data of the first storage device, a third storage device connected to the second adapter and operating in a standby mode, and a fourth storage device connected to the second adapter and configured to mirror data of the third storage device. Each of the first to fourth storage devices changes an operation mode to an active mode or a standby mode using an internal communication.

According to an exemplary embodiment of the inventive concept, a server system includes at least one server, a network switch connected to the at least one server, and at least one redundant storage device connected to the network switch through a first channel and a second channel. The at least one redundant storage device includes a first storage device connected to the first channel and operating in an active mode and a second storage device connected to the second channel and operating in a standby mode. The first storage device transmits an operation mode change request to the second storage device through an internal communication when the first storage device fails. The second storage device changes its operation mode from the standby mode to an active mode in response to the operation mode change request.

According to an exemplary embodiment of the inventive concept, a method of operating a redundant storage device includes a first storage device of the redundant storage device operating in an active mode performing a write operation to store data to the first storage device, the first storage device mirroring the data stored in the first storage device to a second storage device of the redundant storage device operating in the active mode, the first storage device determining whether a failure has occurred in the first storage device, and the first storage device changing an operation mode of a third storage device of the redundant storage device from a standby mode to an active mode when it is determined that the failure has occurred in the first storage device.

According to an exemplary embodiment of the inventive concept, a method of operating a redundant storage device includes the redundant storage device detecting whether a failure has occurred in a first storage device of the redundant storage device set to an active mode, the first storage device sending a request message to a second storage device of the redundant storage device through an internal channel of the redundant storage device when the failure is detected, and the second storage device setting itself of the active mode in response to the request message.

BRIEF DESCRIPTION OF THE FIGURES

The above inventive concept will become apparent from the following description with reference to the following figures, wherein like reference numerals refer to like parts throughout the various figures unless otherwise specified, and wherein

FIG. 2 is a block diagram illustrating a redundant storage device according to an exemplary embodiment of the inventive concept;

FIG. 3 is a block diagram illustrating a redundant storage device according to an exemplary embodiment of the inventive concept;

DETAILED DESCRIPTION

The inventive concept will be described more fully hereinafter with reference to the accompanying drawings, in which exemplary embodiments thereof are shown. It should be noted, however, that the inventive concept is not limited to these exemplary embodiments, and may be implemented in various forms. On the contrary, the inventive concept covers all modifications, equivalents, and alternatives falling within the spirit and scope of the inventive concept. It will be understood that when an element is referred to as being "connected" or "coupled" to another element, it can be directly connected or coupled to the other element or intervening elements may be present.

Figure 1:
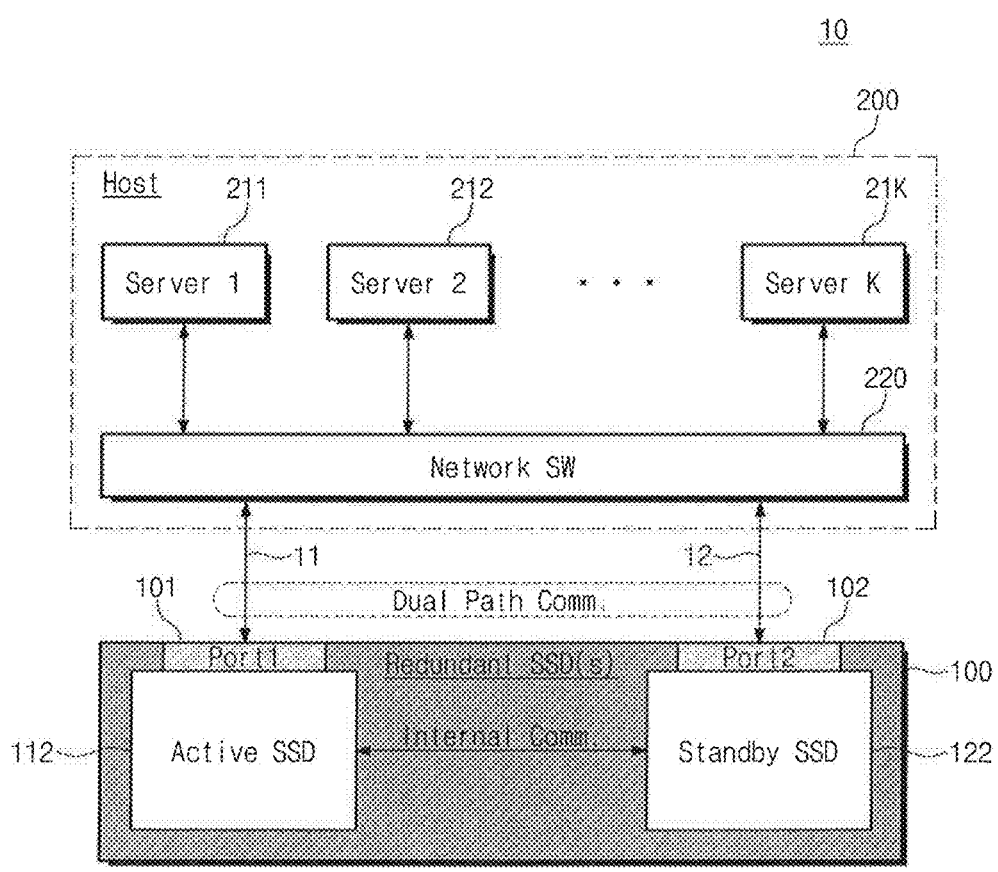
FIG. 1 is a block diagram illustrating a server system according to an exemplary embodiment of the inventive concept.

FIG. 1 is a block diagram illustrating a server system 10 according to an exemplary embodiment of the inventive concept. Referring to FIG. 1, the server system 10 includes at least one redundant storage device (redundant SSD(s)) 100 and a host 200 that controls the redundant storage device 100.

The redundant storage device 100 (or dual port storage device/duplicated storage device/replicated storage device) is a device storing data. The redundant storage device 100 may be configured to perform a dual path communication with the host 200. Here, the dual path communication may mean to independently communicate with the host 200 through each of two different channels (i.e., paths) 11 and 12. For example, a first signal line may be present that connects the host 200 to the first port 101 and a second other signal line distinct from the first signal line may be present that connects the host to the second port 102.

The redundant storage device 100 includes a first port (Port1) 101, a second port (Port2) 102, a first storage device (Active SSD) 112, and a second storage device (Standby SSD) 122.

The first port 101 is connected to the host 200 through the first channel 11. The second port 102 is connected to the host 200 through the second channel 12. In an exemplary embodiment, the first and second ports 101 and 102 are configured to be suitable for the same kind of communication protocol. For example, the first and second ports 11 and 12 may be configured to be suitable for the following communication interfaces: non-volatile memory express (NVMe), peripheral component interconnect express (PCIe), serial at attachment (SATA), small computer system interface (SCSI), serial attached SCSI (SAS), universal storage bus (USB) attached SCSI (UAS), Internet small computer system interface (iSCSI), fiber channel, or fiber channel over ethernet (FCoE).

The first storage device 112 is connected to the first port 101, and the second storage device 122 is connected to the second port 102. The first storage device 112 may be connected to the host 200 through the first port 101, and the second storage device 122 may be connected to the host 200 through the second port 102. In an exemplary embodiment, each of the first and second storage devices 112 and 122 is implemented with the same kind of storage device. For example, each of the first and second storage devices 112 and 122 may be implemented with a solid state drive (SSD).

In FIG. 1, the first storage device (Active SSD) 112 operates in an active mode, and the second storage device (Standby SSD) 122 operates in a standby mode. In an embodiment, a storage device in an active mode performs normal operations (e.g., reads, writes, etc.), and a storage device in a standby mode does not perform the normal operations. In an embodiment, a first storage device in the standby mode is configured to receive a communication from a second storage device in the active mode and change its state (i.e., the state of the second storage device) to the active mode in response to the received communication. In an embodiment, the operation modes of each storage device are initially set by the host 200 during an initialization operation.

In an exemplary embodiment, the operation mode of each of the first and second storage devices 112 and 122 is determined by the host 200 during an initialization operation. For example, the storage device 112 connected to the first port 101 may operate in an active mode, and the storage device 112 connected to the second port 102 may operate in a standby mode, or vice versa.

In an exemplary embodiment, the operation mode of each of the first and second storage devices 112 and 122 is determined according to a management policy of the redundant storage device 100. In an exemplary embodiment, the redundant storage device 100 is configured to automatically change the operation mode of each of the first and second storage devices 112 and 122 using an internal communication. For example, the operation mode of the first storage device 112 operating in an active mode may be changed from an active mode to a standby mode based on a management policy. The host 200 may request the first storage device 112 change the operation mode of the second storage device 122 from a standby mode to an active mode through an internal communication, or vice versa. The internal communication may be a message sent from the first storage device 112 to the second storage device 112 through an internal channel of the redundant storage device. Here, the management policy may include monitoring for system degradation, monitoring for current faults, predicting future faults, and determining the modes based on results of the monitoring and predicting. For example, a self-monitoring analysis report (SMART) technology may be used to perform the monitoring and predicting.

In an exemplary embodiment, when the first storage device 112 operating in an active mode fails, the first storage device 112 generates a failure alarm signal and transmits the failure alarm signal to the second storage device 122 through the internal communication. For example, if the first storage device 112 is involved in an input operation (e.g., a write) or an output operation (e.g., a read), and the operation fails, the first storage device 112 can communicate the failure alarm signal to the second storage device 112. The first storage device 112 may determine that the operation has failed when a timeout occurs in the processing of the operation. For example, if the first storage device 112 attempts to respond to a read request and a pre-defined period of time elapses before the first storage device 112 is able to complete the read request, the timeout has occurred. The second storage device 122 changes its operation mode from a standby mode to an active mode in response to the failure alarm signal of the first storage device 112. Afterwards, the second storage device 122 transmits, to the host 200, information about the changing of the operation mode of each of the first and second storage devices 112 and 122. For example, the information may indicate to the host 200 that the second storage device 122 has changed its operation mode from the standby mode to the active mode.

In an exemplary embodiment, the internal communication may be performed by various kinds of protocols. For example, the internal communication may be performed by a sideband protocol. In an exemplary embodiment, each of the first and second storage devices 112 and 122 include at least one pin for performing the internal communication. In an exemplary embodiment, each of the first and second storage devices 112 and 122 perform the internal communication through a special communication path. In an exemplary, the storage devices perform this internal communication using one or more internal commands.

The host 200 includes a plurality of servers 211, 212, . . . , and 21K, (i.e., K is an integer of two or more) and a network switch ("SW")) 220. Each of the servers 211, 212, . . . , and 21K may be configured to provide at least one service. Each of the servers 211, 212, . . . , and 21K may be implemented using at least one central processing unit (CPU), a memory device, and an operating system. Each of the servers 211, 212, . . . , and 21K are connected to the redundant storage device 100 through the network switch 220.

The network switch 220 may be configured to selectively connect the servers 211, 212, . . . , and 21K with the redundant storage device 100. In an exemplary embodiment, the network switch 220 is implemented using an input/output virtualization technology. For example, the network switch 220 may be logic supporting a single root-input output virtualization (SR-IOV) or a multi root-input output virtualization (MR-IOV). The network switch 220 may be additionally connected to a storage system having at least one hard disk drive (HDD) or a hybrid storage system composed of a HDD and a solid state drive (SSD) that performs redundant communication.

The network switch 220 may be connected to the first and second ports 101 and 102 of the redundant storage device 100 through the first and second channels 11 and 12. The network switch 220 may be configured to be suitable for a communication interface used at the first and second ports 101 and 102. The host 200 illustrated in FIG. 1 is an example. However, the inventive concept is not limited thereto. For example, the host 200 may be configured with a single server or to include additional components.

The server system 10 may support hardware duplication without including all of a storage processor, a host buffer adapter (HBA), an expander, and a storage power supply, thereby removing unnecessary hardware resources and reducing cost.

In an exemplary embodiment, the redundant storage device 100 is configured to further include a mirroring function.

FIG. 2 is a block diagram illustrating a redundant storage device 100a according to an exemplary embodiment of the inventive concept. The redundant storage device 100 of FIG. 1 may be replaced with the redundant storage device 100a of FIG. 2. Referring to FIG. 2, the redundant storage device 100a includes a first port 101a, a second port 102a, a first board 110a, and a second board 120a.

The first board 110a is connected to the first port 101a and includes a first storage device (SSD1) 112a and a first mirroring storage device (SSD2) 114a. The first mirroring storage device 114a may be configured to mirror data of the first storage device 112a, or vice versa. In an exemplary embodiment, a mirroring operation performed by the first mirroring storage device 114a is implemented using a redundant array of inexpensive disks (RAID) technology.

In an exemplary embodiment, the first board 110a is in an active state. That is, the first storage device 112a operates in an active mode, and the first mirroring storage device 114a performs a mirroring function of the first storage device 112a. In an exemplary embodiment, when the first storage device 112a fails, the first mirroring storage device 114a operates in an active mode in place of the first storage device 112a. While operating in an active mode, the first mirroring storage device 114a may be configured to notify the host 200 (refer to FIG. 1) that a storage device connected to the first port 101a is the first mirroring storage device (SSD2) 114a.

The second board 120a is connected to the second port 102a and includes a second storage device (SSD3) 122a and a second mirroring storage device (SSD4) 124a. The second mirroring storage device 124a may be configured to mirror data of the second storage device 122a, or vice versa. In an exemplary embodiment, the second board 120a is in a standby state. That is, the second storage device 122a operates in a standby mode, and the second mirroring storage device 124a performs a mirroring function for the second storage device 122a.

In an exemplary embodiment, the first board 110a and the second board 120a are configured to perform an internal communication. For example, the first board 110a and the second board 120a may be configured to communicate with one another through an internal communication channel of device 100a.

When a fault is detected in the first board 110a, the redundant storage device 100a according to an embodiment of the inventive concept changes the state of the first board 110a from an active state to a standby state and changes the state of the second board 120a from a standby state to an active state. For example, the first board 110a may transmit a state change request to the second board 120a through an internal communication, and the state of the second board 120a may be changed from a standby state to an active state in response to the state change request. At this time, the operation mode of the second storage device 122a of the second board 120a is changed from a standby mode to an active mode. The second storage device 122a then transmits, to the host 200, information about changing the operation mode of the first storage device 112a from an active mode to a standby mode and changing the operation mode of the second storage device 122a from a standby mode to an active mode. For example, the information may indicate that the first storage device 112a is in a standby mode and the second storage device 122a is in the active mode.

While the redundant storage device 100a illustrated in FIG. 2 includes the first and second mirroring storage devices 114a and 124a for storing mirroring data, embodiments of the inventive concept are not limited thereto. The redundant storage device according to an embodiment of the inventive concept may be implemented with the first and second storage devices storing mirroring data without including an independent mirroring storage device. In an embodiment each of the first and second storage devices 112a and 122a is implemented using a redundant array of inexpensive Disk (RAID) technology.

The redundant storage device 100a illustrated in FIG. 2 performs an internal communication between the boards 110a and 120a. However, an embodiment of the inventive concept is not limited thereto. The redundant storage device according to an embodiment of the inventive concept may perform the internal communication between storage devices in a single board as well as between the boards.

FIG. 3 is a block diagram illustrating a redundant storage device 100b according to an exemplary embodiment of the inventive concept. The redundant storage device 100 of FIG. 1 may be replaced with the redundant storage device 100b of FIG. 3. Referring to FIG. 3, the redundant storage device 100b includes a first port 101b, a second port 102b, a first board 110b, and a second board 120b. The first board 110b includes a first storage device 112b and a first mirroring storage device 114b, and the second board 120b includes a second storage device 122b and a second mirroring storage device 124b.

As illustrated in FIG. 3, compared with the redundant storage device 100a illustrated in FIG. 2, the redundant storage device 100b may perform an internal communication between the first storage device 112b and the first mirroring storage device 114b or may perform an internal communication between the second storage device 122b and the second mirroring storage device 124b.

While an embodiment of the inventive concept is exemplified as two storage devices being mounted on a single board in FIGS. 2 and 3, embodiments of the inventive concept are not limited thereto. For example, a single storage device may be mounted on a single board.

Figure 4:
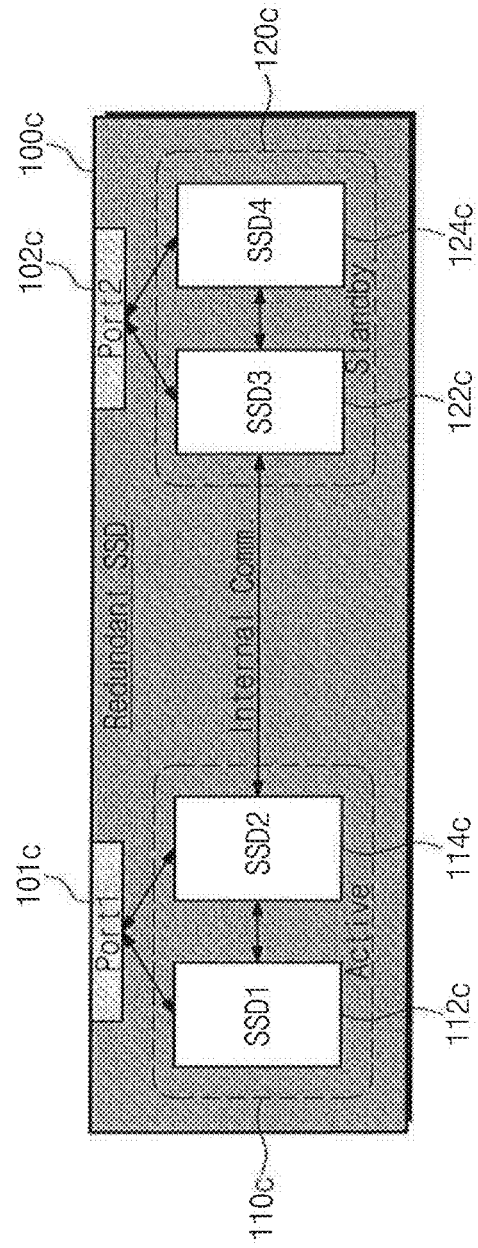
FIG. 4 is a block diagram illustrating a redundant storage device according to an exemplary embodiment of the inventive concept.

FIG. 4 is a block diagram illustrating a redundant storage device 100c according to an exemplary embodiment of the inventive concept. The redundant storage device 100 of FIG. 1 may be replaced with the redundant storage device 100c of FIG. 4. Referring to FIG. 4, the redundant storage device 100c includes a first port 101c, a second port 102c, a first storage device 112c, a second storage device 114c, a third storage device 122c, and a fourth storage device 124c.

The first and second storage devices 112c and 114c may be mounted on a single board and configured to share the first port 101c. The third and fourth storage devices 122c and 124c may be mounted on a single board and configured to share the second port 102c.

Each of the first to fourth storage devices 112c, 114c, 122c, and 124c may be configured to perform an internal communication with one another. Referring to FIG. 4, the internal communication is illustrated between storage devices adjacent to each other. However, embodiments of the inventive concept are not limited thereto. For example, each of storage devices (e.g., the first storage device (SSD1) 112c and the third storage device (SSD3) 122c) that are not adjacent to each other may perform an internal communication with each other. In an exemplary embodiment, the internal communication is implemented with a point-to-point protocol (PPP).

Figure 5:
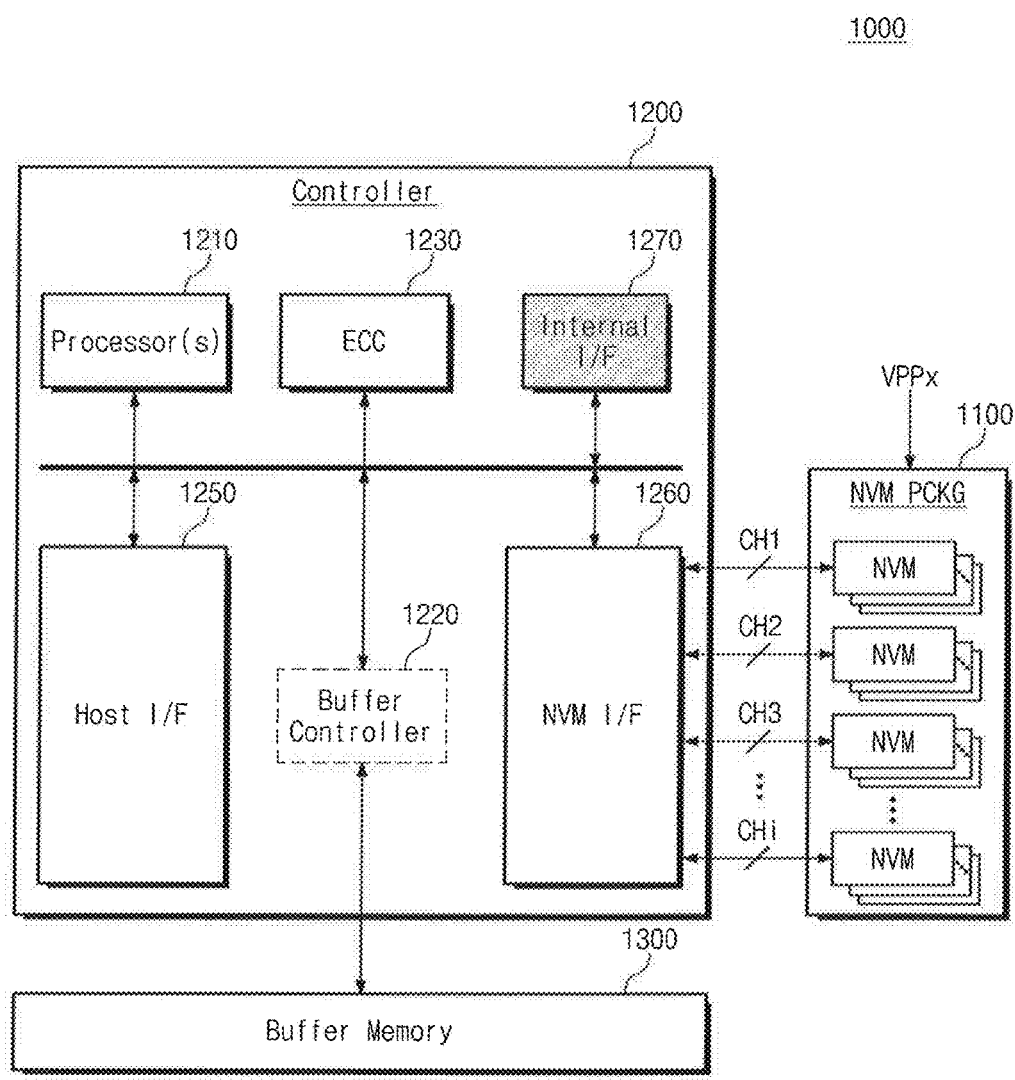
FIG. 5 is a block diagram illustrating a storage device included in a redundant storage device according to an exemplary embodiment of the inventive concept.

FIG. 5 is a block diagram illustrating a storage device included in a redundant storage device according to an exemplary embodiment of the inventive concept. Referring to FIG. 5, a storage device 1000 includes a nonvolatile memory package 1100, a controller 1200 controlling the nonvolatile memory package 1100, and a buffer memory 1300.

The nonvolatile memory package 1100 may be configured to optionally receive an external high-voltage Vppx. The nonvolatile memory package 1100 may be implemented with at least one nonvolatile memory device connected to each of a plurality of channels CH1 to CHi (i.e., 'i' is an integer of two or more). The nonvolatile memory device may be a NAND flash memory, a vertical NAND flash memory (VNAND), a NOR flash memory, a resistive random access memory (RRAM), a phase change memory (PRAM), a magneto-resistive random access memory (MRAM), a ferroelectric random access memory (FRAM), a spin transfer torque random access memory (STT-RAM), or the like.

Furthermore, the nonvolatile memory may be configured to have a three-dimensional array structure. In an exemplary embodiment of the inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The circuit related on an operation of memory cells may be located in a substrate or on a substrate. The term "monolithic" means that layers of each level of the array are directly deposited on the layers of each underlying level of the array.

In an exemplary embodiment of the inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells. At least one selection transistor may have the same structure as memory cells, and be monolithically formed together with memory cells.

The following patent documents, which are hereby incorporated by reference, describe suitable configurations for three-dimensional memory arrays, in which the three-dimensional memory array is configured as a plurality of levels, which is applied by Samsung Electronics Co., with word lines and/or bit lines shared between levels: U.S. Pat. Nos. 7,679,133; 8,553,466; 8,654,587; 8,559,235; and US Pat. Pub. No. 2011/0233648. The nonvolatile memory according to an exemplary embodiment of the inventive concept may be applicable to a charge trap flash (CTF) in which an insulating layer is used as a charge storage layer, as well as a flash memory device in which a conductive floating gate is used as a charge storage layer.

The controller 1200 is connected to the nonvolatile memory package 1100 through the channels CH1 to CHi. The controller 1200 may be configured to perform an error correction code (ECC) function, a wear leveling, a bad block management, and a signal processing operation. In an embodiment, the wear leveling is used to prolong the life of memory of the nonvolatile memory package 1100. In an embodiment, the bad block management keeps tracks of blocks of the memory that are faulty and data that would otherwise be stored in a bad block is instead stored in another block. The controller 1200 includes at least one processor 1210, an error correction code (ECC) circuit 1230, a host interface 1250, a nonvolatile memory interface ("NVM I/F") 1260, and an internal interface 1270.

The at least one processor 1210 may control an overall operation of the storage device 1000.

The ECC circuit 1230 may calculate a value of an error correction code of data to be programmed during a writing operation, may correct data read during a reading operation based on the value of the error correction code, and may correct an error recovered from the nonvolatile memory package 1100 during a data recovery operation. The ECC circuit 1230 may correct an error using a coded modulation such as a low density parity check (LDPC) code, a Bose, Chaudhuri, Hocque-nghem (BCH) code, a turbo code, a Reed-Solomon code, a convolution code, a recursive systematic code (RSC), a trellis-coded modulation (TCM), or a block coded modulation (BCM).

A code memory for storing code data for an operation of the controller 1200 may be further included in the ECC circuit 1230. The code memory may be implemented with a nonvolatile memory device.

The host interface (Host I/F) 1250 may provide a function to interface with an external host (e.g., the host 200 of FIG. 1). In an exemplary embodiment, the host interface 1250 may be implemented with various kinds of interfaces and may be implemented with different kinds of a plurality of interfaces. For example, the host interface 1250 may be connected to the network switch 220 (refer to FIG. 1) of the host 200 through the first port 101 (refer to FIG. 1) or the second port 102 (refer to FIG. 1) that is connected to the host 200. The host interface 1250 may be implemented with a communication interface: a non-volatile memory express (NVMe), a peripheral component interconnect express (PCIe), a serial AT attachment (SATA), a small computer system interface (SCSI), a serial attached SCSI (SAS), a universal storage bus (USB) attached SCSI (UAS), an internet small computer system interface (iSCSI), a fiber Channel, or a fiber channel over ethernet (FCoE).

The nonvolatile memory interface (NVM I/F) 1260 may provide a function to interface with the nonvolatile memory package 1100. For example, the nonvolatile memory interface 1260 may be implemented with a legacy NAND interface or a vertical NAND flash memory (V-NAND) interface. However, it is to be understood that the nonvolatile memory interface 1260 is not limited hereto.

The internal interface 1270 may be used to perform an internal communication with another storage device in the redundant storage device 100 (refer to FIG. 1). In an exemplary embodiment, the internal interface 1270 is implemented with a sideband interface. The internal interface 1270 may issue and transmit a command indicating the changing of an operation mode based on an internal management policy of the controller 1200 or based on whether the storage device 1000 fails. In an exemplary embodiment, a signal line connects a first internal interface 1270 disposed within the first memory device 112 to a second internal interface 1270 disposed within the second memory device 122 and the internal communication passes through the signal line.

The buffer memory 1300 may temporarily store data for an operation of the controller 1200. The buffer memory 1300 may include a plurality of memory lines storing data or a command. Here, a plurality of memory lines may be mapped to cache lines using various methods. The buffer memory 1300 may store page bitmap information and read count information. The page bitmap information and the read count information may be read from the nonvolatile memory package 1100 during a power-up operation and may be updated according to an internal operation. The updated page bitmap information and read count information may be periodically or aperiodically stored in the nonvolatile memory package 1100. In an exemplary embodiment, the buffer memory 1300 may be implemented with a volatile memory or a nonvolatile memory. For example, the buffer memory 1300 may be implemented by a dynamic random access memory (DRAM) or a phase random access memory (PRAM).

While the buffer memory 1300 illustrated in FIG. 5 is arranged outside the controller 1200, embodiments of the inventive concept are not limited thereto. For example, the buffer memory 1300 may be arranged inside the controller 1200.

Each of the first and second storage devices 112 and 122 illustrated in FIG. 1, the storage devices 112*a*, 114*a*, 122*a*, and 124*a* illustrated in FIG. 2, the storage devices 112*b*, 114*b*, 122*b*, and 124*b* illustrated in FIG. 3, and the storage devices 112*c*, 114*c*, 122*c*, and 124*c* illustrated in FIG. 4 may be implemented with the storage device 1000 illustrated in FIG. 5.

The storage device 1000 in a redundant storage device according to an embodiment of the inventive concept may include the internal interface 1270, and thus the storage device 1000 may perform an internal communication with other components of the redundant storage device.

In an exemplary embodiment of the inventive concept, the storage device 1000 is implemented on a single board.

Figure 6:
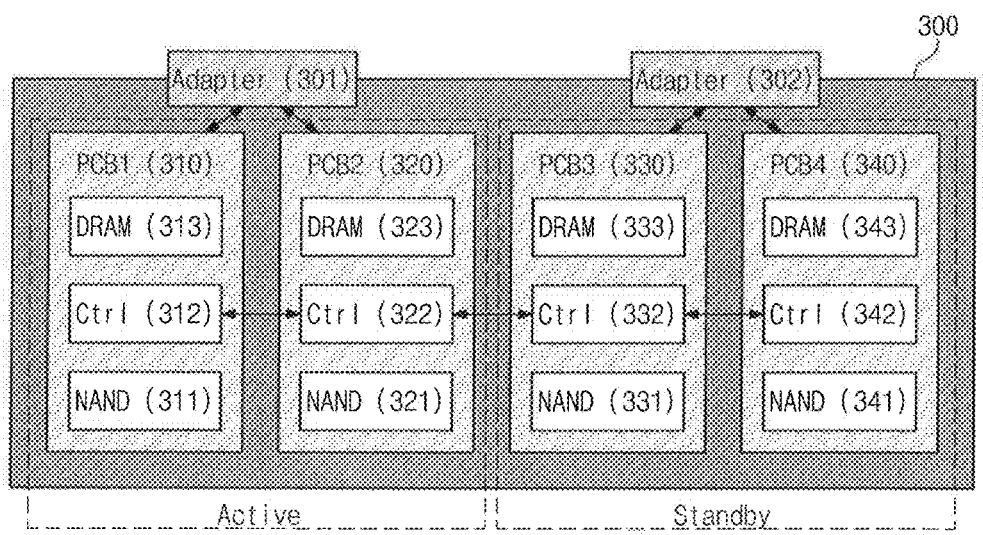
FIG. 6 is a block diagram illustrating a redundant storage device according to an exemplary embodiment of the inventive concept.

FIG. 6 is a block diagram illustrating a redundant storage device 300 according to an exemplary embodiment of the inventive concept. Referring to FIG. 6, the redundant storage device 300 includes a first adapter 301, a second adapter 302, and first to fourth boards (PCB1 to PCB4) 310, 320, 330, and 340.

The first and second adapters 301 and 302 may be configured to be connected to the network switch 220 illustrated in FIG. 1. Each of the first and second adapters 301 and 302 may be configured to perform a function on each of the first and second ports 101 and 102 described in FIG. 1.

In an exemplary embodiment, the first board 310 and the second board 320 are connected to the first adapter 301. In an exemplary embodiment, each of the first board 310 and the second board 320 are configured to be removable from the first adapter 301. For example, the first adaptor 301 may have a receptacle or a protrusion that is shaped to mate with a receptacle or a protrusion of the boards 310 and 320 so that physical pressure can be used to insert the boards into the first adaptor 301 or disconnect the boards from the first adaptor 301. In an exemplary embodiment, the third board 330 and the fourth board 340 are connected to the second adapter 302. In an exemplary embodiment, each of the first board 330 and the second board 340 are configured to be removable from the second adapter 302. For example, the second adaptor 301 may have a receptacle or a protrusion that is shaped to mate with a receptacle or a protrusion of the boards 330 and 340 so that physical pressure can be used to insert the boards into the second adaptor 302 or disconnect the boards from the second adaptor 302.

Each of the boards 310 to 340 may constitute a storage device including a flash memory (NAND), a controller (Ctrl), and a DRAM. Each of the boards 310 to 340 may be implemented with the storage device 1000 illustrated in FIG. 5. In an exemplary embodiment, each of the boards 310 to 340 is implemented with a printed circuit board (PCB). The first board 310 includes a first flash memory (NAND) 311, a first controller (Ctrl) 312, and a first DRAM 313. The second board 320 includes a second flash memory (NAND) 321, a second controller (Ctrl) 322, and a second DRAM 323. The third board 330 includes a third flash memory (NAND) 331, a third controller (Ctrl) 332, and a third DRAM 333. The fourth board 340 includes a fourth flash memory (NAND) 341, a fourth controller (Ctrl) 342, and a fourth DRAM 343.

In an exemplary embodiment, the first and second boards 310 and 320 connected to the first adapter 301 are placed into an active state, and the third and fourth boards 330 and 340 connected to the second adapter 302 are placed into a standby state.

In an exemplary embodiment, each of the boards 310 to 340 is configured to perform an internal communication with one another. In an exemplary embodiment, the operation state of each of the boards 310 to 340 is configured to be changed from an active state to a standby state or from a standby state to an active state through an internal communication. In particular, the controller (Ctrl) of each of the boards 310 to 340 may include an internal interface for performing the internal communication.

The redundant storage device 300 illustrated in FIG. 6 performs an internal communication between the controllers. However, an embodiment of the inventive concept is not limited thereto. The redundant storage device according to an embodiment of the inventive concept is configured to perform an internal communication between other elements (e.g., a flash memory (NAND) and a DRAM) except the controller.

Figure 7:
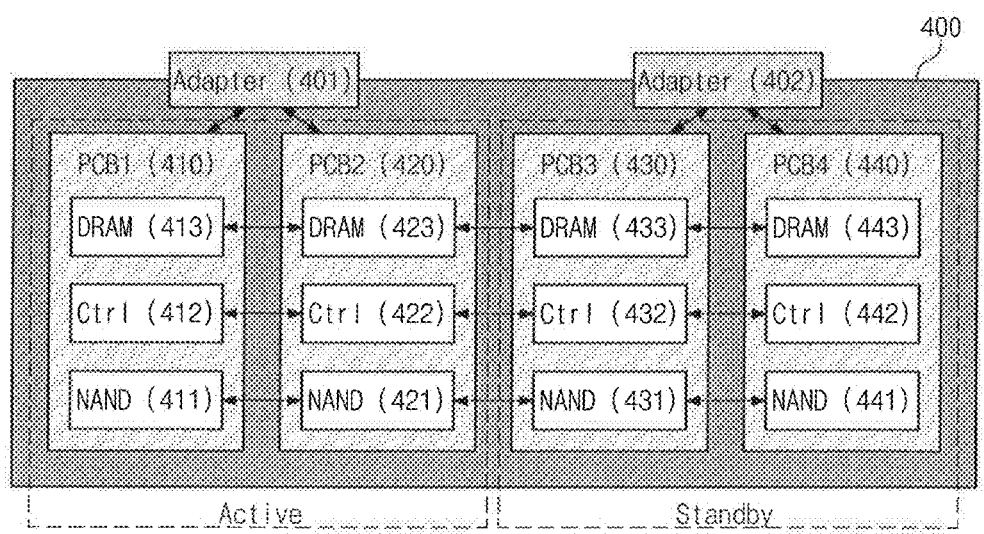
FIG. 7 is a block diagram illustrating a redundant storage device according to an exemplary embodiment of the inventive concept.

FIG. 7 is a block diagram illustrating a redundant storage device 400 according to an exemplary embodiment of the inventive concept. Referring to FIG. 7, the redundant storage device 400 includes a first adapter 401, a second adapter 402, and first to fourth boards (PCB1 to PCB4) 410, 420, 430, and 440. Compared with the redundant storage device 300 illustrated in FIG. 6, the redundant storage device 400 illustrated in FIG. 7 may perform an internal communication between DRAMs 413, 423, 433, and 443, may perform an internal communication between controllers 412, 422, 432, and 442 and may perform an internal communication between NANDs 411, 421, 431, and 441.

In an exemplary embodiment, when at least one internal component of each of the first to fourth boards (PCB1 to PCB4) 410 to 440 fails, the redundant storage device 400 is configured to arbitrarily use the internal component of another board. For example, when the NAND 411 of the first board (PCB1) 410 fails, the controller 412 of the first board 410 may control the NAND 431 of the third board (PCB3) 430 through an internal communication.

Figure 8:
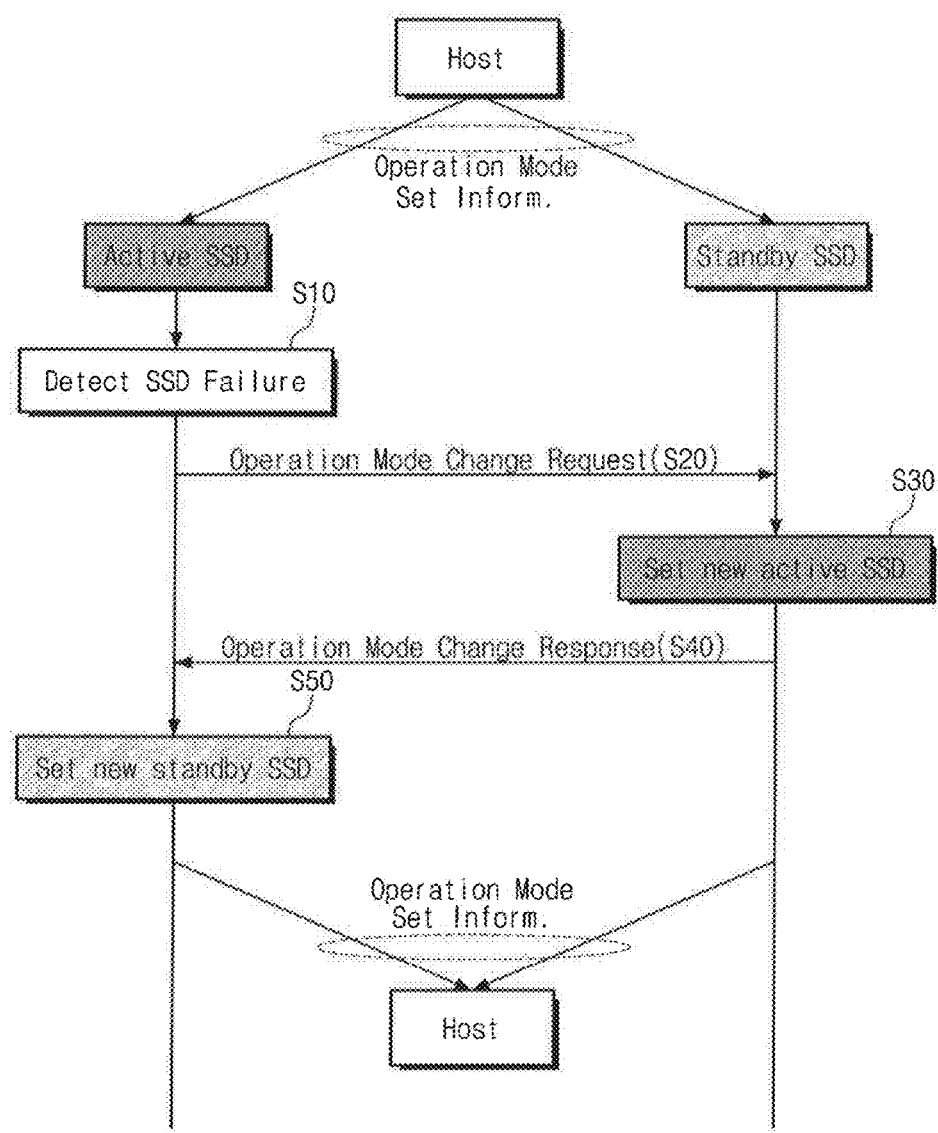
FIG. 8 is a ladder diagram illustrating a method of operating a server system according to an exemplary embodiment of the inventive concept.

FIG. 8 is a ladder diagram illustrating a method of operating a server system according to an exemplary embodiment of the inventive concept. Referring to FIGS. 1 to 8, the method of a server system 10 (refer to FIG. 1) may proceed as follows.

During an initialization operation of the redundant storage device 100 (refer to FIG. 1), the host 200 (refer to FIG. 1) transmits operation mode setting information to the first and second storage devices 112 and 122 to allow the first storage device 112 (refer to FIG. 1) connected to the first port 101 (refer to FIG. 1) to operate in an active mode and to allow the second storage device 122 (refer to FIG. 1) connected to the second port 102 (refer to FIG. 1) to operate in a standby mode. For example, the operation mode setting information may include state information that indicates the first storage device 112 is to operate in the active mode and the second storage device is to operate in the standby mode. The operation mode setting information may further include a unique identifier along with the state information so that the receiving storage device can compare the received identifier with an identifier stored therein to determine the received state information is for it or another storage device.

The first storage device 112 operates in an active mode. During an operation in the active mode, a storage device failure (i.e., SSD Failure) is detected (S10). The failure may be detected according to the internal management policy or the fault of the first storage device 112. When the storage device failure is detected, the first storage device 112 transmits an operation mode change request to the second storage device 122 through an internal communication (S20). The operation mode of the second storage device 122 changes from a standby mode to an active mode in response to the operation mode change request. Accordingly, an operation mode of the storage device 122 is set to a new active mode (S30). Afterwards, the second storage device 122 transmits, to the first storage device 112, a response message indicating that the operation mode change request has completed through an internal communication (S40). The operation mode of the first storage device 112 is changed from an active mode to a standby mode in response to the response message of changing an operation mode (S50). Afterwards, the first and second storage devices 112 and 122 transmit operation mode setting information to the host 200. For example, the first storage device 112 may inform the host it has changed its mode to the standby mode in response to receiving the response message, and the second storage device 122 may inform the host that it has changed its mode to the active mode after sending the response message.

In an exemplary embodiment, before a storage device of a redundant storage device completes changing of its operation mode, the redundant storage migrates mirroring data of an existing active area to a new active area.

Figure 9:
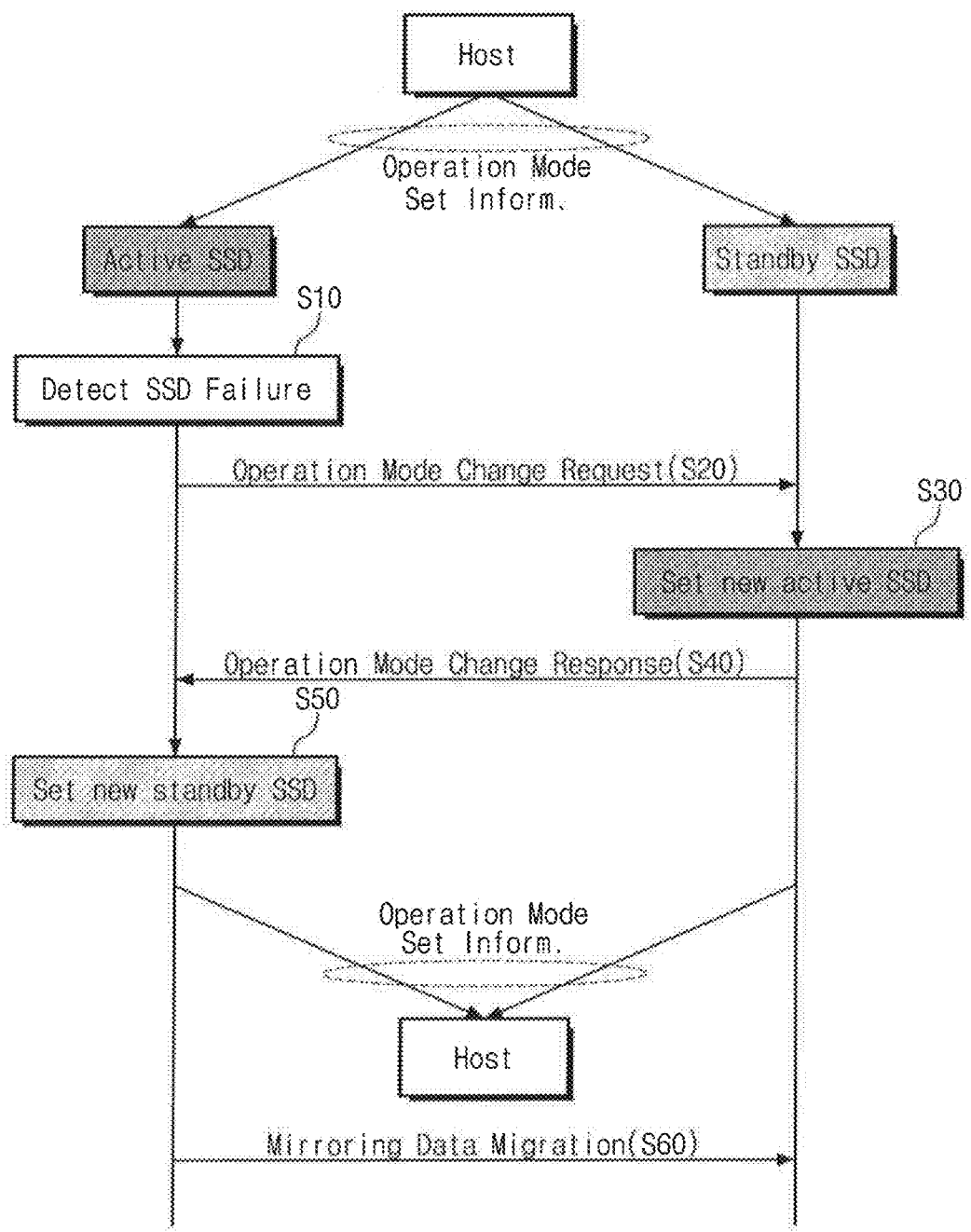
FIG. 9 is a ladder diagram illustrating a method of operating a server system according to an exemplary embodiment of the inventive concept.

FIG. 9 is a ladder diagram illustrating a method of operating a server system according to an exemplary embodiment of the inventive concept. Compared with the server system 10 illustrated in FIG. 8, in the method of the server system 10 (refer to FIG. 1) illustrated in FIG. 9, mirroring data of an existing active area (e.g., 110) is migrated to the storage device (SSD3) 122a of a new active area (e.g., 120) (S60). In an exemplary embodiment, the mirroring data migration is performed using an internal communication. In another embodiment, the mirroring data migration is performed use an external communication.

In an exemplary embodiment, the redundant storage device further includes an indicator indicating an operation mode.

Figure 10:
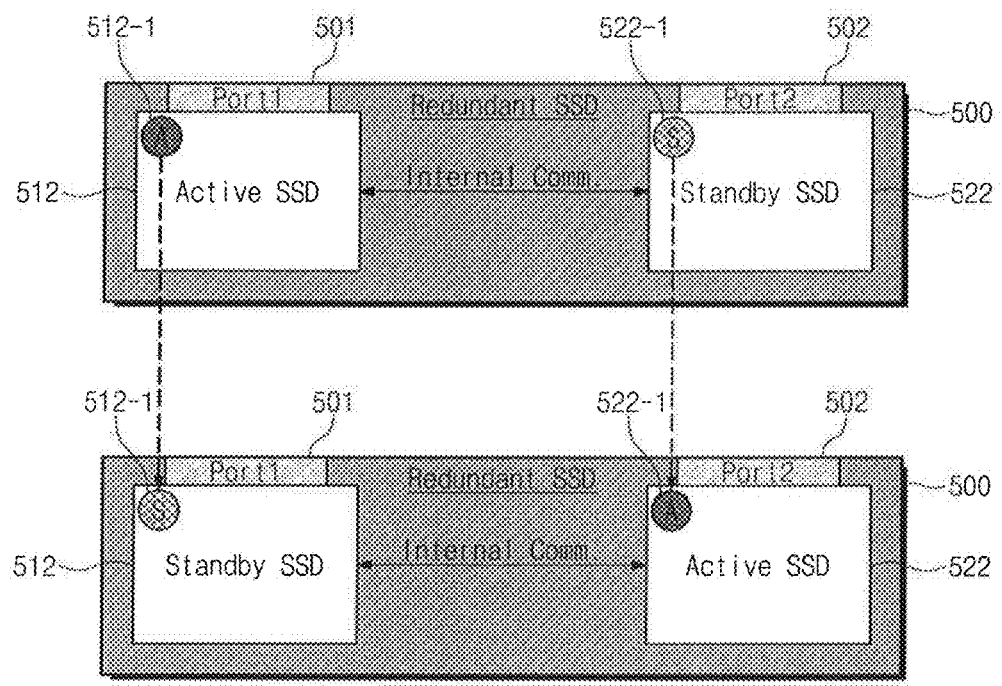
FIG. 10 is a block diagram illustrating a redundant storage device indicating a changing of an operation mode according to an exemplary embodiment of the inventive concept.

FIG. 10 is a block diagram illustrating a redundant storage device indicating a changing of an operation mode according to an exemplary embodiment of the inventive concept. Referring to FIG. 10, a redundant storage device 500 includes first and second ports 501 and 502 and first and second storage devices 512 and 522. Each of the first and second storage devices 512 and 522 includes operation mode indicators 512-1 and 522-1 each of which indicates an operation mode. In an exemplary embodiment, each of the operation mode indicators 512-1 and 522-1 is a plurality of light emitting diodes (LEDs) that emit different color lights based on an operation mode. For example, a blue color LED A may indicate an active mode, and a yellow color LED S may indicate a standby mode.

In an exemplary embodiment, each of operation mode indicators 512-1 and 522-1 are a display device.

When an operation mode is changed, the indication of the indicator 512-1 of the first storage device 512 is changed from the indication of the active mode A to the indication of the standby mode S, and the indication of the indicator 522-1 of the second storage device 522 is changed from the indication of the standby mode S to the indication of the active mode A.

The redundant storage device according to an embodiment of the inventive concept further includes an indicator indicating health information of a storage device. For example, the health information may indicate that the storage device has not been written much, has been written an average amount of times, or has been written excessively, so that a user can determine whether or not the storage device should be replaced.

Figure 11:
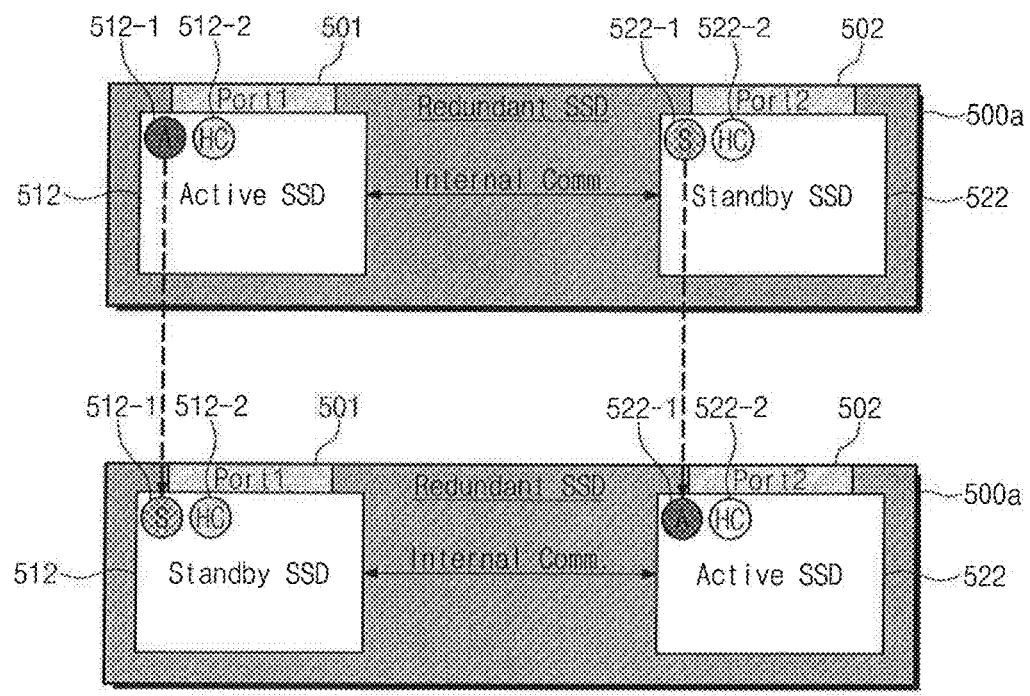
FIG. 11 is a block diagram illustrating a redundant storage device indicating a changing of an operation mode according to an exemplary embodiment of the inventive concept.

FIG. 11 is a block diagram illustrating a redundant storage device indicating a changing of an operation mode according to an exemplary embodiment of the inventive concept. Referring to FIG. 11, a redundant storage device 500a further includes health indicators 512-2 and 522-2 indicating health information of a storage device, compared with the redundant storage device 500 illustrated in FIG. 10. In an exemplary embodiment, each of the health indicators 512-2 and 522-2 include a plurality of LEDs that emit different color lights based on the health state of a storage device. For example, a blue color LED may indicate that the health state of a storage device is a good level, a yellow color LED may indicate that the health state of a storage device is a normal level, and a red color LED may indicate that the health state of a storage device is a bad level. In an exemplary embodiment, the health information may be determined according to a management policy of each of the storage devices 512 and 522.

In an exemplary embodiment, each of the health indicators 512-2 and 522-2 is a display device.

In an exemplary embodiment, after checking the health indicators 512-2 and 522-2, each of which indicates health information, using the naked eye, a user may change an operation mode based on a selection of the user. In an exemplary embodiment, the redundant storage device includes one or more depressible or slidable buttons or dip switches that can be adjusted by the user to set a storage device of the redundant storage device to an active or a standby mode.

In the redundant storage device according to an embodiment of the inventive concept, a physical storage device may be replaced according to the displayed health information.

Figure 12:
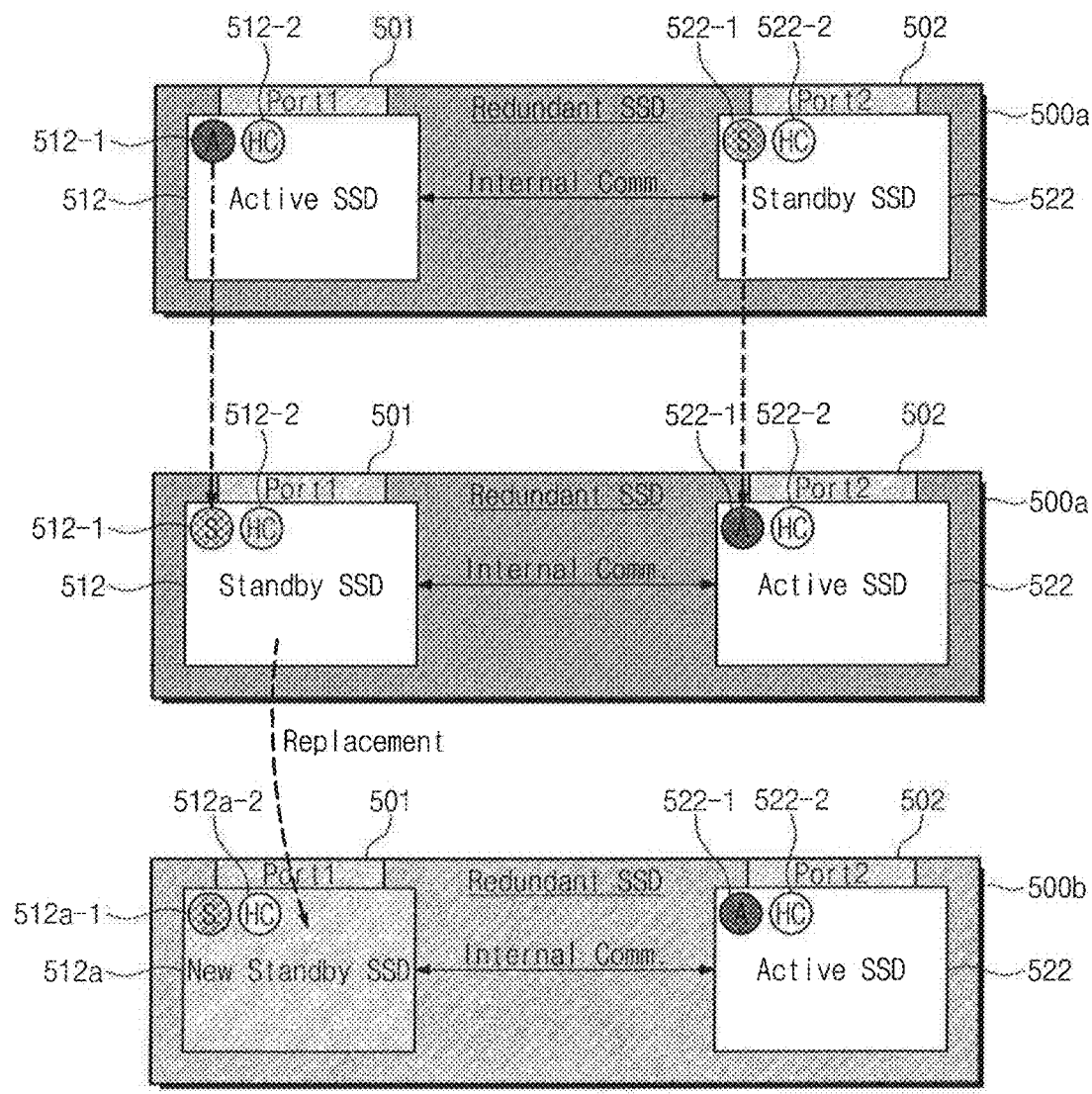
FIG. 12 is a block diagram illustrating a storage device replacing method of a redundant storage device according to an exemplary embodiment of the inventive concept.

FIG. 12 is a block diagram illustrating a method of operating a redundant storage device according to an exemplary embodiment of the inventive concept. Referring to FIG. 12, in the redundant storage device 500a, after an operation mode is changed, a user replaces the storage device 512, of which a health state is not good, of a standby mode with a storage device 512a, of which a health state is good. The resulting redundant storage device may be referenced as device 500b. In an exemplary embodiment, each of the storage devices 512-2 and 522-2 in the redundant storage device 500a is implemented with a structure (e.g., hot-swap) that is removable from the body of the redundant storage device 500a. The storage device 512a includes a health indicator 512a-1 similar to the health indicator 512-2 of storage device 512.

After the replacement of a storage device, the redundant storage device 500b includes the storage device 512a operating in a new standby mode. Afterwards, the redundant storage device 500b transmits, to the host 200 (refer to FIG. 1), operation mode setting information associated with the storage device 512a of a new standby mode and the storage device 522 operating in an active mode.

The operation mode indicators are not limited to those depicted in FIG. 11 and the health indicators are not limited to those depicted in FIG. 12. Each of the storage devices of the redundant storage devices according to an embodiment of the inventive concept may include display device for indicating operation mode information and health information.

Figure 13:
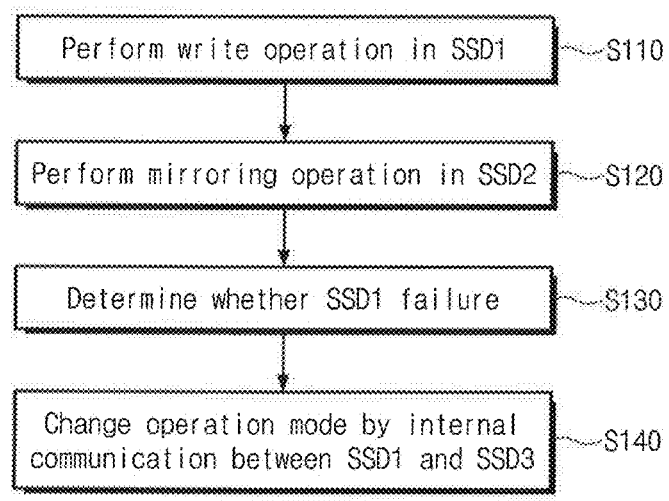
FIG. 13 is a flow chart describing a method of operating a redundant storage device according to an exemplary embodiment of the inventive concept.

FIG. 13 is a flow chart for describing a method of operating a redundant storage device according to an embodiment of the inventive concept. Referring to FIGS. 1 to 13, the operation method of the redundant storage device may be described below.

A write operation is performed with respect to the first storage device (SSD1) (refer to FIG. 2) of the redundant storage device in response to the request of a host (S110). Data written in the first storage device (SSD1) is mirrored to the second storage device (SSD2) (S120). For example, a duplicate copy of the written data may be stored in the second storage device. Afterwards, it is determined whether a failure has occurred within the first storage device (SSD1) (S130). Here, the failure of the first storage device SSD1 may be a failure of a read/write operation. Besides, the failure of the first storage device (SSD1) may result from various types of faults. In an exemplary embodiment, the failure of the first storage device (SSD1) is determined based on a degradation level changed according to a management policy. For example, if the policy indicates that a memory device is no longer reliable after it has been written a pre-defined number of times, it can be determined that a failure has occurred when the number of writes to the memory device has exceeded the pre-defined number. When the first storage device (SSD1) fails, the operation mode of the first storage device (SSD1) is changed into the operation mode of the third storage device (SSD3) (refer to FIG. 2) through an internal communication (S140). For example, if the third storage device SSD3 is in a standby mode, the first storage device SD1 changes from the active mode to the standby mode. Afterwards, the mirroring data of the second storage device (SSD2) may be migrated to the third storage device (SSD3) (refer to FIG. 2), and the data of the third storage device (SSD3) may be mirrored to the fourth storage device (SSD4) (refer to FIG. 2).

A server system according to an embodiment of the inventive concept may be configured to be suitable for a non-volatile memory express (NVMe) interface.

Figure 14:
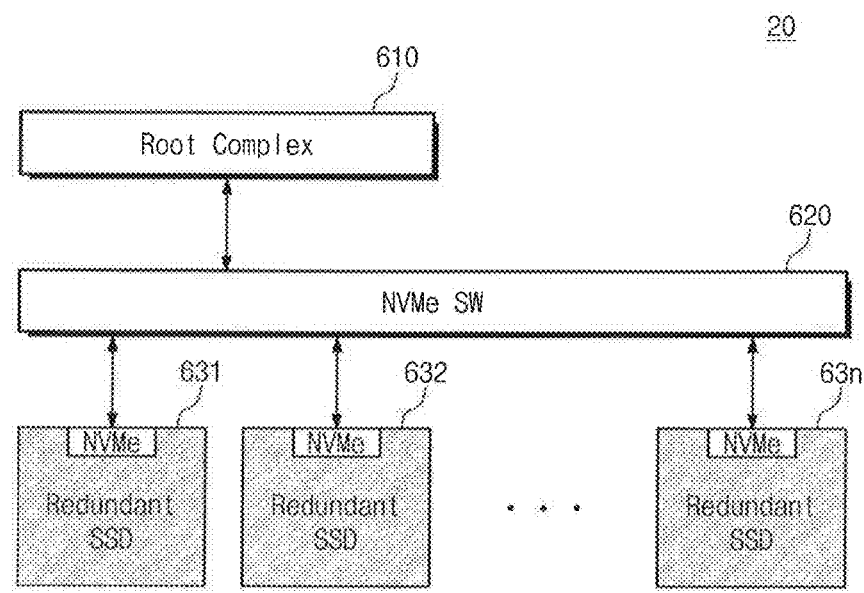
FIG. 14 is a block diagram illustrating a server system according to an exemplary embodiment of the inventive concept.

FIG. 14 is a block diagram illustrating a server system 20 according to an exemplary embodiment of the inventive concept. Referring to FIG. 14, the server system 20 includes a root complex 610, an NVMe switch 620, and a plurality of redundant storage devices 631, 632, ..., and 63n (i.e., 'n' is an integer of two or more). Internal components of the server system 20 may communicate with one another based on an NVMe interface. Each of a plurality of the redundant storage devices 631, 632, ..., and 63n may be implemented with a hardware redundant storage device described in FIGS. 1 to 13. The root complex 610 may contain one or more PCI Express ports.

Figure 15:
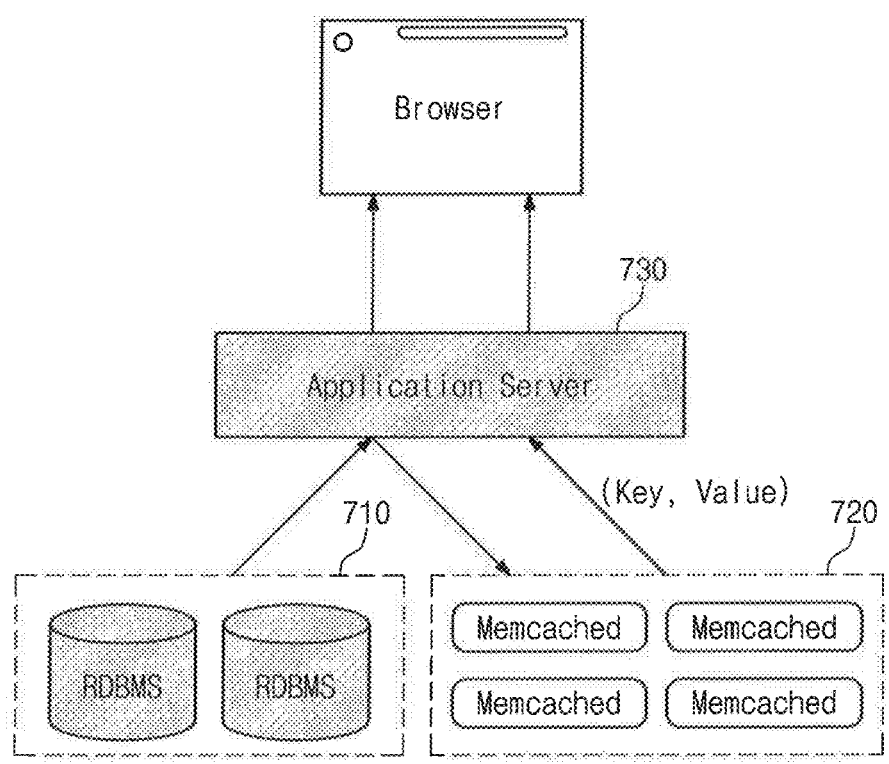
FIG. 15 is a block diagram illustrating a server system according to an exemplary embodiment of the inventive concept.

FIG. 15 is a block diagram illustrating a server system 30 according to an exemplary embodiment of the inventive concept. Referring to FIG. 15, the server system 30 includes a database management system (RDBMS) 710, a cache server 720, and an application server 730. The cache server 720 may include one or more memory caches ("Memcached").

The cache server 720 may maintain, delete, and store one or more key value pairs in compliance with an invalidation notification from the database management system 710. The database management system 710 may include the redundant storage device described with reference to FIGS. 1 to 14.

The server system 30 according to an embodiment of the inventive concept may implement hardware duplication through a redundant storage device, thereby significantly reducing installation cost and management cost, as compared with a conventional server system.

In FIGS. 1 to 15, an operation mode may be changed using an internal communication of the redundant storage device. However, an embodiment of the inventive concept is not limited thereto. For example, the operation mode of the redundant storage device may be changed through an external communication.

Figure 16:
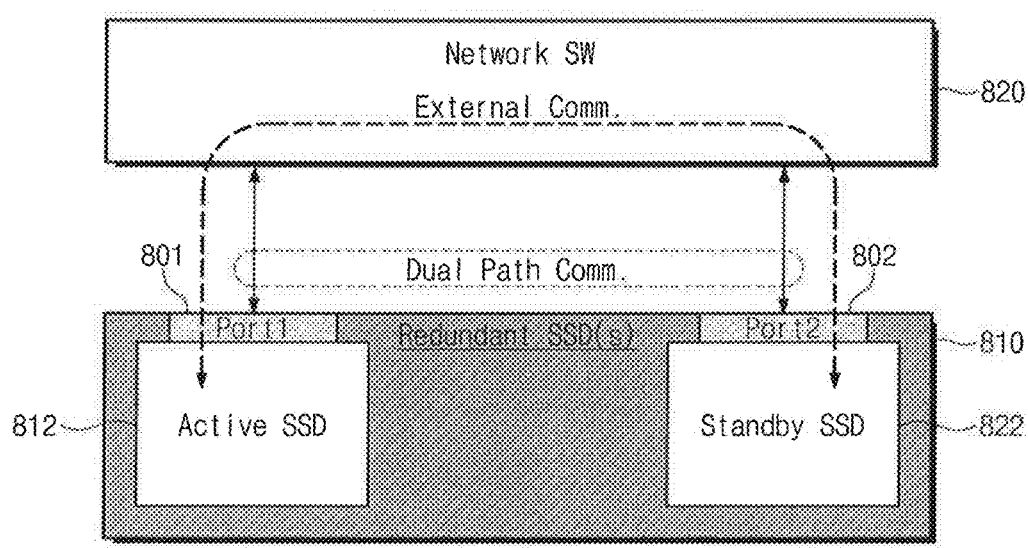
FIG. 16 is a block diagram illustrating a server system according to an exemplary embodiment of the inventive concept.

FIG. 16 is a block diagram illustrating a server system 40 according to an exemplary embodiment of the inventive concept. Referring to FIG. 16, the server system 40 includes a redundant storage device 810 and a network switch 820.

The redundant storage device 810 includes first and second storage devices 812 and 822. The operation mode of the first and second storage devices 812 and 822 may be changed using an external communication that goes through the first and second ports 801 and 802 and the network switch 820, not using the internal communication described in FIGS. 1 to 16.

A redundant storage device supporting duplication is described in FIGS. 1 to 16. A device supporting duplication is an example. An embodiment of the inventive concept is not limited thereto. For example, the storage device according to an embodiment of the inventive concept may support triplication or multiplication.

At least one embodiment of the inventive concept provides a redundant storage device, a server system including the same, and an operation method thereof that includes storage devices changing an operation mode through an internal communication, thereby improving redundancy and reducing downtime.

What is claimed is:

1. A redundant storage device, comprising:
   a first port;
   a second port different from the first port;
   a first storage device connected to the first port and having an operation mode initially set to an active mode to perform a normal operation; and
   a second storage device connected to the second port,
   wherein the first storage device sends a signal to the second storage device through an internal channel between the first and second storage devices when the first storage device fails to perform the normal operation to change an operation mode of the second storage device from a standby mode to the active mode to enable the second storage device to perform the normal operation.

2. The redundant storage device of claim 1, wherein the operation mode of the second storage device is initially set to the standby mode by a host during an initialization operation.

3. The redundant storage device of claim 1, further comprising:
   a first mirroring storage device configured to store mirroring data of the first storage device; and
   a second mirroring storage device configured to store mirroring data of the second storage device.

4. The redundant storage device of claim 3, wherein the first storage device and the first mirroring storage device are mounted on a first board,
   wherein the second storage device and the second mirroring storage device are mounted on a second board, and
   wherein the first board is placed in an active state and the second board is placed in a standby state during an initialization operation.

5. The redundant storage device of claim 4, wherein the signal is exchanged between the first board and the second board.

6. The redundant storage device of claim 3, wherein the first storage device is mounted on a first board,
   wherein the first mirroring storage device is mounted on a second board,
   wherein the second storage device is mounted on a third board,
   wherein the second mirroring storage device is mounted on a fourth board, and
   wherein the internal communication is exchanged between the first to fourth boards.

7. The redundant storage device of claim 1, wherein each of the first and second storage devices comprises:
   at least one nonvolatile memory device;
   a controller configured to control the at least one nonvolatile memory device; and
   a buffer memory configured to store input/output data or data for the operation, and
   wherein the controller comprises an internal communication interface for transmitting the signal through the internal channel.

8. The redundant storage device of claim 1, wherein each of the first and second storage devices further comprises an operation mode indicator indicating the corresponding operation mode.

9. The redundant storage device of claim 8, wherein each of the first and second storage devices further comprises a health indicator indicating health information.

10. A redundant storage device, comprising:
    a first adapter;
    a second adapter different from the first adapter;
    a first storage device connected to the first adapter and having an operation mode initially set to an active mode;
    a second storage device connected to the first adapter and configured to mirror data of the first storage device;
    a third storage device connected to the second adapter and having an operation mode initially set to a standby mode; and
    a fourth storage device connected to the second adapter and configured to mirror data of the third storage device,
    wherein mirroring data of the second storage device is migrated to the third storage device before the third storage device changes its operation mode to the active mode, in response to the third storage device receiving a request from the first storage device through an internal channel.

11. The redundant storage device of claim 10, wherein each of the first to fourth storage devices is mounted on a printed circuit board.

12. The redundant storage device of claim 10, wherein each of the first to fourth storage devices comprises:
    a nonvolatile memory package comprising at least one NAND flash memory device;
    a controller configured to control the nonvolatile memory package; and
    a dynamic random access memory (DRAM) configured to store input/output data or data for an operation, and
    wherein the controller comprises an internal communication interface for transmitting the request through the internal channel.

13. The redundant storage device of claim 12, wherein one nonvolatile memory package being one storage device among the first to fourth storage devices and another nonvolatile memory package being one storage device among the first to fourth storage devices perform an internal communication with one another, and wherein one DRAM being one storage device among the first to fourth storage devices and another DRAM being one storage device among the first to fourth storage devices perform an internal communication with one another.

14. The redundant storage device of claim 10, wherein third storage device further comprises at least one dedicated pin for receiving the request.

15. A method of operating a redundant storage device comprising a first storage device and a second storage device, the method comprising:
- detecting, by the first storage device set to an active mode, whether a failure has occurred in performing a normal operation by the first storage device;
- sending, by the first storage device, a request message to the second storage device set to a standby mode through an internal channel of the redundant storage device between the first and second storage devices when the failure is detected; and
- setting, by the second storage device, the second storage device to the active mode in response to receipt of the request message through the internal channel to enable the second storage device to perform the normal operation.

16. The method of claim 15, further comprising:
- sending, by the second storage device, a response message to the first storage device through the internal channel after the second storage device is set to the active mode; and
- setting, by the first storage device the first storage device to the standby mode, in response to the response message.

17. The method of claim 16, further comprising:
- sending, by the first storage device, first information to a host device indicating the first storage device is in the standby mode; and
- sending, by the second storage device, second information to the host device indicating the second storage device is in the active mode.

18. The method of claim 15, further comprising:
- selecting, by a host device, a device among the first and second storage devices that is currently set to the active mode using information received from the first and second memory devices; and
- sending, by the host device, a read or a write command only to the selected device.

* * * * *